June 15, 1965  P. R. SCOTT ETAL  3,189,180
CYCLONE-CENTRIFUGE SEPARATOR
Filed July 18, 1961  2 Sheets-Sheet 1
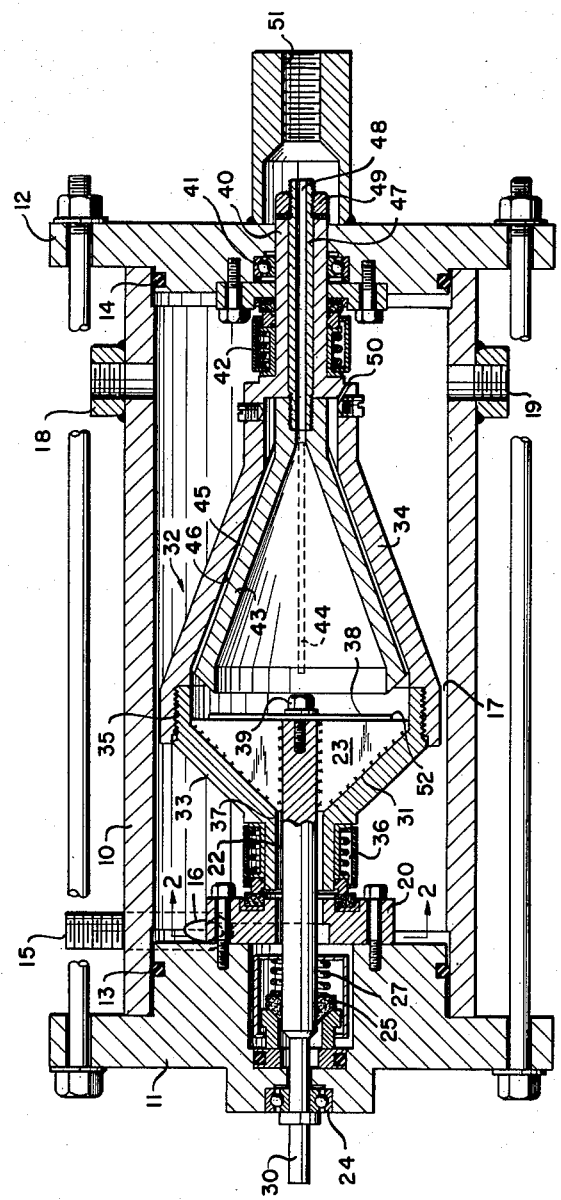
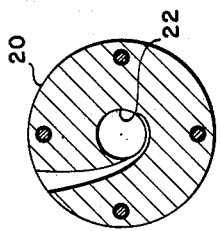
INVENTORS:
P.R. SCOTT
J. MIZENKO
BY: *Theodore E. Bieber*
THEIR ATTORNEY INVENTORS:
P.R. SCOTT
J. MIZENKO
BY Theodore E. Bieber
THEIR ATTORNEY

3,189,180
CYCLONE-CENTRIFUGE SEPARATOR

Paul R. Scott, Houston, and John W. Mizenko, Crosby, Tex., assignors to Shell Oil Company, New York, N.Y., a corporation of Delaware
Filed July 18, 1961, Ser. No. 124,937
2 Claims. (Cl. 210—256)

This invention pertains to pipeline equipment and more particularly to an apparatus for supplying a clean crude oil sample that may be utilized in compensating automatic custody transfer equipment for changes in a dielectric strength of the crude oil.

In recent years many oil field gathering systems have been converted from manual to automatic operation. The automatic operation includes the transfer of custody of the oil from the oil field to the pipeline. In order to effect such a transfer it is necessary to know the quantity of oil transferred and various physical properties of the oil such as its temperature and the amount of bottom sediment and water (BS and W). The normal BS and W recorders use a capacitance cell to determine the water content of the crude oil stream. Of course, this capitance cell is merely responding to the dielectric strength of the material flowing between its plates. The dielectric strength of most crude oils from any one particular formation remains constant but in contrast, the dielectric strength of crude oils from different formations can vary considerably. Thus, at present it is necessary to either install individual equipment for each oil field or else manually adjust the BS and W recorders when the type of crude being transferred changes.

The dielectric strength of crude oils is also an indication of the specific gravity of the crude. Thus, if it were possible to determine the actual dielectric strength of the crude one could easily determine the specific gravity of the crude.

Accordingly, it is the principal object of this invention to provide an automatic apparatus that will receive a sample of dirty crude oil and convert it to a clean dry oil sample for use in determining the dielectric strength of crude oil.

A further object of the present invention is to provide an apparatus which will receive a sample of dirty crude oil under pressure and utilize the pressure of the crude oil to operate filtering equipment for removing the BS and W content of the crude to supply a clean dry sample of the crude.

A further object of the present invention is to provide an apparatus which will receive a sample of dirty crude oil under normal pipeline pressure and utilize the pressure of the crude oil to prevent a change in the physical properties of the hydrocarbon phase while passing through the filtering equipment for removing the BS and W content of the crude to supply a clean dry sample unchanged in intrinsic properties.

A still further object of the present invention is to provide a novel apparatus combining a cyclone type separator with a centrifuge type of filter that utilizes the pressure of the crude oil to cause the oil sample to flow through the apparatus.

The above objects and advantages of this invention are achieved by providing a cyclone type separator having a centrifuge type filter disposed therein. The crude oil sample under pressure is introduced through a tangential nozzle into the cyclone separator. The tangential nozzle establishes a spiral flow within the separator which is increased by the rotating basket of the centrifuge type filter. The rotational energy of the crude adjacent the center region of the cyclone separator is reconverted to pressure by a stationary reversed centripetal pump vane. The pressure created by the centripetal pump vane is used to force the crude sample into the interior of the rotating basket of the centrifuge type filter. The centrifuge type filter then removes the remaining BS and W content of the crude sample and discharges a clean dry sample of crude. The clean dry sample of crude may then be used in a reference capacitance cell whose output signal can then be used to compensate the BS and W recorder used in the crude oil stream.

The above objects and advantages of the present invention will be more easily understood from the following detailed description of the preferred embodiments when taken in conjunction with the attached drawing in which:

FIGURE 1 is a longitudinal section of an apparatus constructed in accordance with this invention and showing the disposition of the centrifuge type filter within the housing of the cyclone separator;

FIGURE 2 is a cross-section taken along line 2—2 of FIGURE 1 and showing the mounting of the fixed centripetal pump vane.

Figure 3:
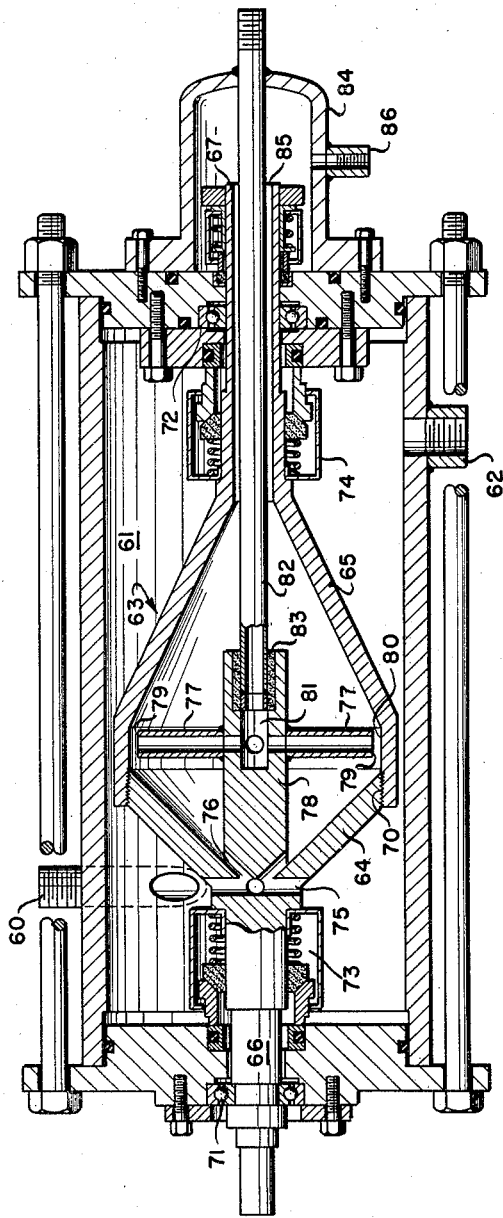
FIGURE 3 is a longitudinal section of a second apparatus constructed in accordance with this invention and suitable for removing contaminants that are lighter than the desired sample.

Referring now to FIGURE 1 there is shown a cylindrical housing 10 having end wall members 11 and 12. The joints between the end wall members and the cylindrical housing are sealed by any desired means, such as O-rings 13 and 14. The cylindrical housing 10 is provided with an inlet 15 which communicates with a tangential nozzle 16. The nozzle 16 is disposed to inject the crude oil sample into the interior of the cylindrical housing 10 tangentially to the inner surface thereof. An outlet opening 19 is formed in the opposite end of the cylindrical housing 10 to discharge the major portion of the crude oil sample admitted through the nozzle 16. A combined inspection and gauge opening 18 is also provided at the top of the cylindrical housing 10.

By injecting the crude oil sample into the interior of the cylindrical housing 10 tangentially with the inner surface thereof, a spiral flow will be established in the crude oil sample. This spiral flow will be augmented or assisted by the rotating basket 32 of the centrifuge type filter to be described below. It should be noted that only a small clearance 17 exists between the outer diameter of the basket 32 and the cylindrical housing 10. Thus, the spiral flow initiated by the tangential nozzle will be considerably increased by the rotating basket 32. The spiral flowing stream will tend to force the heavier particles and water to the outer area of the cylindrical housing 10 permitting the cleaner portion of the crude sample to migrate to the central region of the housing.

As the cleaner portion of the sample migrates to the inner area of the housing 10, it will be intercepted by the centripetal pump vane 20 which is securely fastened to the end wall 11 of the housing as shown in FIGURE 2. The vane 21 of the centripetal pump vane will intercept the crude sample migrating towards the center region of the housing 10 and convert the spiral energy of the crude sample to pressure. The pressure of the sample will cause it to flow through the annular passageway 22 surrounding the shaft 30 into the interior of the rotating basket 32 of the centrifuge type filter. The shaft 30 drives the rotating basket 32 and is rotatably supported in the end wall 11 of the housing by means of a bearing 24. The shaft 30 passes through an opening in the end wall which is sealed by means of mechanical seal 25 held in place by a spring 27, that surrounds the shaft 30.

The rotating basket 32 is formed from two conical shaped end pieces 33 and 34 that are joined together at their large ends by a suitable fastening means such as the threaded joint 35. The joint between the end of the conical section 33 and the radial surface of the centripetal pump vane 20 is sealed by means of a mechanical seal 36. An annular clearance 37 is provided in the end of the section 33 around the shaft 30 in order that the crude sample discharged by the centripetal pump vane may flow freely into the interior of the rotating basket 32.

The end of the shaft 30 that extends into the rotating basket 32 is provided with a plurality of radial vanes 23. The outer edges 31 of the radial vanes have substantially the same profile as the inner surface of the conical end 33. The radial vanes 23 serve as both a centrifugal pump to force the crude sample outwardly along the inner surface of the section 33 and a means for driving the rotating basket 32. The vanes 23 drive the rotor basket by the friction between their outer edges 31 and the end piece 33 although it may be necessary to fasten the vanes to the end 33 to insure that the rotor basket is driven. The shaft 30, of course, is driven in a motor means not shown in FIGURE 1. The crude sample is prevented from flowing longitudinally along the shaft 30 by an end plate 38 fastened to the end of the shaft 30 by any desired means such as a small cap screw 39. The outer diameter 52 of the plate 38 is slightly smaller than the inner diameter of the two conical members 33 and 34 thus providing a small annular clearance around the outer edge of the plate 38.

The small end of the conical end piece 34 terminates in a shaft 40 that is rotatably mounted in the end wall 12 by means of a bearing 41. The opening between the outer surface of the end 40 and the end wall is sealed by means of a mechanical seal 42.

A conical shaped flow directing member 43 is disposed within the conical end 34 and spaced from the inner wall 46 thereof. The small clearance 45 between the flow directing member 43 and the inner wall of the conical member 34 provides a passageway by which the remaining BS and W content of the crude sample may pass downwardly along the inner wall of the conical end member 34 and out this opening 50 formed adjacent the small end 40 thereof. To assist the flow of the BS and W content, shallow grooves 44 are formed in the outer surface of the flow directing member 43.

The flow directing member 43 is provided with a sloping end surface to assist in separating the contaminants from the sample. The diameter of the flow directing member 43 is smaller than the outer diameter 52 of the plate 38 to cause a reversal in the flow of the sample and assist in separating the contaminants therefrom. Once the clean dry sample passes into the interior of the flow directing member 43 it will flow along the inner surface thereof to an outlet opening 48. The outlet opening 48 is formed in a tubular section 47 that is secured to the small end of the member 43. The tubular section 47 passes through the central opening formed in the shaft portion 40 of the conical end 34 of the rotating basket. The flow directing member 43 is secured to the conical end 34 by a nut 49 that threads over the end of the tubular member 47. The end wall 12 of the outer housing is provided with an outlet opening 51 which communicates with the passageway 48 formed in the tubular member 47.

When the above apparatus is operated the inlet 15 is coupled to the conduit that obtains a crude oil sample from a pipeline or the like. The crude oil sample should be supplied to the apparatus under sufficient pressure for the nozzle 16 to induce a spiral flow as the sample is introduced in the housing 10. The spiral flow induced by the nozzle 16 will cause the greater portion of BS and W sediment to be separated from the sample. This separation will be assisted by the rotation of the basket 32 which will increase the velocity of the spiral flow. The cleaner portion of the sample will pass through the fixed centripetal pump vane 20 that converts the spiral energy into pressure to force the sample into the basket 32 of the centrifuge type filter. The rapidly rotating basket 32 will separate the remaining BC and W content from the crude sample and discharge the clean oil sample through the outlet 51. Similarly, the BS and W separated from the sample by the rotating basket will flow outwardly through the opening 50 where it will join the portion of the sample being discharged by the cyclone separator.

The important feature of this invention is the use of the pressure of the sample to induce a spiral flow in the sample when it is introduced in the cylindrical housing 10. This separates the major portion of the BS and W content from the sample and permits a relatively clean sample to be supplied to the rotating basket 32 of the centrifuge type filter. The use of the fixed centripetal pump vane 20 provides a simple means by which the rotating or spiral energy of the partially filtered sample can be converted to pressure to cause the sample to flow into the rotating basket 32. Finally, the rotating basket 32 and the flow directing means 43 disposed therein separate the remaining BS and W content from the crude sample and discharge a clean sample from the outlet 51.

Referring now to FIGURE 3 there is shown a modified embodiment of this invention suitable for separating light contaminants from a sample stream. The sample stream is introduced into the chamber 61 through a longitudinal nozzle 60. The nozzle 60 induces a spiral flow in the sample which separates the solid particles. A majority of the sample and solid particles will be removed through the outlet 62.

The rotating basket 63 of the embodiment of FIGURE 3 is slightly modified from the rotating basket 32 of FIGURE 1. The rotating basket 63 is formed from two conical shaped sections 64 and 65, joined by means of a threaded section 70. A shaft portion 66 is formed integrally with the conical section 64 and a similar tubular shaft section 67 is formed integrally with the conical section 65. The shaft section 66 is supported in a bearing 71 while the shaft section 67 is supported in a similar bearing 72. Mechanical shaft seals 73 and 74 are provided for sealing the openings where the shafts pass through the end walls of the housing.

The shaft section 66 adjacent the small end of the conical section 64 is provided with four openings 75 that are preferably aligned with the axis of the tangential nozzle 60. The openings 75 serve to provide fluid communication between the chamber 61 and the interior of the rotating basket 63. Four additional inclined holes 76 are provided in the interior of the conical section 64 and are disposed to intercept the openings 75 to complete the communication between the chamber 61 and the interior of the rotating basket 63.

A spider arrangement formed by four radially-extending tubular members 77 is provided in the interior of the conical section 64. The four tubular members are secured to a stub shaft 78 that extends from the center of the conical section 64. The ends 79 of the four tubular members 77 should terminate a slight distance from the inner diameter 80 of the conical section 65. The actual clearance between the ends 79 and the diameter 80 is not critical but should be maintained relatively small to improve performance as will be explained below. The inner ends of the four tubular members 77 communicate with the passageway 81 formed in the stub shaft 78. The passageway 81 communicates with the tubular member 82 which passes through the interior of the tubular shaft portion 67 of the conical section 65. The left end of the tubular member 82 is supported by a bearing member 83 which is preferably formed of a material, for example a polymer of tetrafluorethylene known by the trade name Teflon, that contains no unsaturated hydrocarbons yet has self-lubricating properties. It is, of course, necessary to support the left end of the tubular member 82 in a bearing to permit the rotating basket 63 to rotate since right end of the tubular member 82 is permanently sealed to a head member 84 formed in the end wall of the housing. Thus, the tubular member 82 can remain stationary while the spider arrangement described above rotates with the rotating basket 63. The tubular member 82 has a smaller outer diameter than the opening in the tubular shaft portion 67 to provide an annular space 85. The annular space 85 communicates with the interior of the head member 84 with an opening 86 being provided for removing the fluid therefrom.

When the above-described embodiment is operated the contaminated sample is introduced through the tangential nozzle 60 under sufficient pressure to cause it to flow through the remainder of the apparatus. The tangential nozzle 60 will induce a spiral flow in the fluid which will be augmented by the action of the rotating basket 63. This spiral flow will cause the solid particles contained in the sample to separate from the sample and be withdrawn through the discharge opening 62. A portion of the fluid sample will be forced through the openings 75 and 76 into the interior of the rotating basket 63 as a result of the pressure differential between the chamber 61 and the interior of the rotating basket 63. When the fluid is introduced into the interior of the rotating basket 63 the heavier portion of the fluid will be forced outwardly along the sloping wall of the conical section 64 as a result of the centrifugal action of the rotating basket 63. This heavier portion of the fluid will be drawn off through the hollow tubular members 77 of the spider arrangement and discharged through the tube 82. While the heavier portion is moved the lighter portion of the sample within the basket 63 will migrate towards the center where it will flow through the annular space 85 between the tubular member 82 and the interior of the shaft 67 and be discharged through the opening 86. For efficient operation of the device, it is necessary that sufficient fluid be introduced through the nozzle 60 to maintain the outer ends 79 of the spider arrangement submerged in the heavier portion of the sample which is drawn off through the tube 82. Providing the ends 79 of the spider arrangement are maintained submerged in the heavier portion of the sample, the device will separate the lighter contaminants from the heavier sample and thus provide a clean sample that is discharged through the tube 82.

The above-described embodiment of this invention is useful when it is necessary to separate a heavier material from a contaminated sample that contains both solid particles and a lighter fluid contaminate. This problem often arises in chemical processes where it is necessary to separate oil from water in order that the water may be analyzed before it is discharged into streams or other disposal areas. The portion of oil and other contaminates in the water make it difficult to effectively analyze water and accordingly it must be removed prior to analyzing the water. Similarly, heavier chemicals often have lighter contaminants that must be removed before the chemicals may be analyzed.

While this invention has been described with relation to the obtaining of a clean sample from a dirty crude oil sample it obviously may be used to provide a clean sample of any liquid. Many industrial operations require the use of a clean sample for analysis or other operations. This invention provides an efficient means by which the pressure of the liquid sample is used to force the fluid through the filter. This eliminates the need for any auxiliary equipment or pumps, thus improving the efficiency of the equipment.

While but two embodiments of this invention have been described in detail it should not be limited to the specific details described but only to its broad spirit and scope.

We claim as our invention:

1. An apparatus for converting a sample of a liquid lighter than water to a clean dry sample, said apparatus comprising: a closed cylindrical housing; a tangential nozzle disposed in said housing for introducing said sample tangentially into said housing; a centripetal turbine blade means fastened to said housing and disposed to intercept a portion of the sample introduced into said housing and convert its rotational energy to pressure; an outlet disposed in said housing for discharging the remaining portion of the sample; a shaft rotatably mounted in said housing and projecting through the wall thereof, a hollow rotor member secured to said shaft and disposed within said housing, said centripetal turbine blade being disposed to discharge said portion of the sample into said hollow rotor at one end; said hollow rotor having small diameter ends and a larger diameter central section with flow control means for forcing said portion of the sample to flow outward to said center section; said center section including a flow control means disposed to divert the heavy portion of said portion of the sample adjacent the inner wall of said rotor to cause the heavy portion to flow to the other end thereof and be discharged into said housing; said flow control means diverting the lighter portion of said portion of the sample to the center of said rotor and a discharge opening coupled to the other end of said rotor and passing through the wall of said housing.

2. An apparatus for receiving a dirty sample of a fluid under pressure and converting it to a clean fluid sample, said apparatus comprising: a housing formed by a cylindrical member having closed ends; a tangential nozzle mounted on said cylindrical member and discharging into the interior of said housing, conduit means communicating with said nozzle to supply said sample thereto; a centripetal pump vane fastened to one end wall of said housing and disposed adjacent said tangential nozzle; a hollow rotor rotatably supported in the end walls of said housing and having a shaft extending through the end wall on which said centripetal pump vane is fastened; said hollow rotor having conical end sections jointed to each other to form said rotor; a pump member having radial vanes disposed in said rotor and mounted on said shaft, the outer profile of said vanes corresponding to the inner surfaces of one conical end of said hollow rotor; passage means surrounding said shaft to permit fluid communication between the discharge of said centripetal pump vane and the interior of said one conical end of said hollow rotor; a conical flow directing member mounted in the other conical end of said hollow rotor and spaced from the wall thereof; said flow directing member terminating in a tubular outlet passing through the end of said other conical end of said hollow rotor and an outlet formed in the other end wall of said housing, said outlet communicating with the tubular outlet of said flow directing means.

References Cited by the Examiner

UNITED STATES PATENTS

| | | | |
|---|---|---|---|
| 2,067,273 | 1/37 | Knowles et al. | 233—33 X |
| 2,403,089 | 7/46 | Lars | 233—32 |
| 2,485,209 | 10/49 | Lundal | 233—27 |
| 2,881,974 | 4/59 | Ruf | 233—45 |
| 2,996,187 | 8/61 | Payne | 210—512 |
| 3,127,255 | 3/64 | Winslow. | |

REUBEN FRIEDMAN, *Primary Examiner.*

GEORGE D. MITCHELL, HERBERT L. MARTIN,
*Examiners.*